United States Patent
Graube et al.

(10) Patent No.: US 9,306,660 B2
(45) Date of Patent: Apr. 5, 2016

(54) DYNAMIC INTERACTIVE ZONE DRIVEN PROXIMITY AWARENESS SYSTEM

(71) Applicant: Qualcomm Technologies International, Ltd., Cambridge (GB)

(72) Inventors: Nicolas Graube, Barrington (GB); Saranjit Singh Saund, Los Altos, CA (US); Athellina Rosina Ahmad Athsani, Santa Clara, CA (US); Arthur James, San Jose, CA (US); Anthony Simon, San Jose, CA (US)

(73) Assignee: Qualcomm Technologies International, Ltd., Cambridge (GB)

( * ) Notice: Subject to any disclaimer, the term of this patent is extended or adjusted under 35 U.S.C. 154(b) by 406 days.

(21) Appl. No.: 13/747,824

(22) Filed: Jan. 23, 2013

(65) Prior Publication Data

US 2014/0113560 A1 Apr. 24, 2014

Related U.S. Application Data

(60) Provisional application No. 61/717,066, filed on Oct. 22, 2012, provisional application No. 61/725,094, filed on Nov. 12, 2012.

(51) Int. Cl.
*H04B 7/00* (2006.01)
*H04B 7/26* (2006.01)
(Continued)

(52) U.S. Cl.
CPC .............. *H04B 7/26* (2013.01); *G06Q 30/0259* (2013.01); *G06Q 30/0261* (2013.01); *H04W 4/008* (2013.01); *H04W 4/023* (2013.01)

(58) Field of Classification Search
CPC .......... H04B 7/26; H04W 4/023; H04W 4/008
USPC ........................................... 455/41.2
See application file for complete search history.

(56) References Cited

U.S. PATENT DOCUMENTS 6,236,335 B1 5/2001 Goodwin, III
7,413,121 B2 8/2008 Goel et al.
(Continued)

FOREIGN PATENT DOCUMENTS

CN 102932911 A 2/2013
EP 2624193 A1 8/2013
(Continued)

OTHER PUBLICATIONS

Bluetooth SIG Inc., "Bluetooth Specification—Proximity Profile", pp. 1-21, 2001.
(Continued)

*Primary Examiner* — Ajibola Akinyemi
(74) *Attorney, Agent, or Firm* — Mahamedi Paradice LLP

(57) ABSTRACT

A system of short-range communication devices identify specific regions of interest within an area. In addition, a set of ranges or zones is defined for each of the short-range communication devices and conditions and actions are assigned to the zones. A client device senses a short-range communications device and associates conditions and actions to the client device. The client device determines its zone, analyzes the conditions and, if at least one condition is met, triggers the action(s). The history or context of the client device within the area may be analyzed to generate additional conditions and/or actions, or to modify existing conditions and/or actions associated with the specific zones.

36 Claims, 6 Drawing Sheets

(51) Int. Cl.
*H04W 4/00* (2009.01)
*H04W 4/02* (2009.01)
*G06Q 30/02* (2012.01)

(56) References Cited

U.S. PATENT DOCUMENTS

| | | | |
|---|---|---|---|
| 7,574,732 | B2 | 8/2009 | Knox et al. |
| 7,714,773 | B2 | 5/2010 | Ozaki et al. |
| 8,279,112 | B2 | 10/2012 | Carrick |
| 8,723,720 | B2 | 5/2014 | Moffatt et al. |
| 9,031,858 | B2 * | 5/2015 | Angell et al. .............. 705/14.52 |
| 2002/0126013 | A1 | 9/2002 | Bridgelall |
| 2004/0002305 | A1 | 1/2004 | Byman-Kivivuori et al. |
| 2005/0078006 | A1 | 4/2005 | Hutchins et al. |
| 2006/0164236 | A1 | 7/2006 | Siegl et al. |
| 2006/0192709 | A1 | 8/2006 | Schantz et al. |
| 2006/0200378 | A1 | 9/2006 | Sorensen |
| 2008/0189170 | A1 | 8/2008 | Ramachandra |
| 2009/0027228 | A1 | 1/2009 | Tricoukes et al. |
| 2009/0240571 | A1 * | 9/2009 | Bonner ................ G01S 5/14 705/27.1 |
| 2010/0039228 | A1 | 2/2010 | Sadr et al. |
| 2010/0049594 | A1 | 2/2010 | Bonner et al. |
| 2010/0309051 | A1 | 12/2010 | Moshfeghi |
| 2011/0028093 | A1 | 2/2011 | Patel et al. |
| 2011/0060652 | A1 * | 3/2011 | Morton ................ H04W 4/043 705/14.58 |
| 2011/0112892 | A1 | 5/2011 | Tarantino |
| 2011/0119132 | A1 | 5/2011 | Morton et al. |
| 2011/0270519 | A1 | 11/2011 | Park et al. |
| 2012/0072861 | A1 | 3/2012 | Tuli et al. |
| 2012/0182172 | A1 | 7/2012 | Sorensen |
| 2014/0006191 | A1 | 1/2014 | Shankar et al. |
| 2014/0111380 | A1 | 4/2014 | Gibbs et al. |
| 2014/0370816 | A1 * | 12/2014 | Bobrow ...................... 455/41.2 |

FOREIGN PATENT DOCUMENTS

| | | |
|---|---|---|
| EP | 2626193 A1 | 8/2013 |
| GB | 2441644 A | 3/2008 |
| WO | WO-2005015257 A1 | 2/2005 |
| WO | WO 2009/091553 | 7/2009 |
| WO | WO-2012011624 A1 | 1/2012 |
| WO | WO-2012110703 A1 | 8/2012 |

OTHER PUBLICATIONS

Bluetooth SIG Inc., "Bluetooth Specification—Alert Notification Profile", pp. 1-19., 2011.

GB Search Report issued in related GB Application No. 1317310.9, dated Oct. 20, 2014.

GB Search Report for GB Appln. No. 1317310.9, dated Mar. 17, 2014.

* cited by examiner

DYNAMIC INTERACTIVE ZONE DRIVEN PROXIMITY AWARENESS SYSTEM

BACKGROUND OF THE INVENTION

The present invention concerns proximity awareness systems and, in particular an interactive proximity awareness system in which actions are dynamically applied based on proximity zones and historical data.

Short-range beacons using technologies such as infrared, ultrasonics, near-field communications (NFC) and Bluetooth® have been used to determine the presence of a device in the transmission range of the beacon. These technologies have also been used to provide short-range telemetry, such as a device that remotely measures a patient's body temperature.

SUMMARY OF THE INVENTION

The present invention is embodied in a system of short-range communication devices that define one or more regions of interest relative to at least one of the short-range communications devices. Each of these regions of interest has a set of ranges or zones defined relative to the short-range communication device. Actions and conditions are assigned to the zones. An action is initiated if at least one corresponding condition is satisfied; one or more actions may be initiated, for example, based on activity of a client device relative to the zone. In one embodiment, the system may monitor the history or context of a movable short-range communication device within the area to generate additional conditions and/or actions or modify existing conditions and/or actions associated with the specific locations.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. The letter "n" may represent a non-specific number of elements. Also, lines without arrows connecting components may represent a bi-directional exchange between these components. According to common practice, the various features of the drawings are not drawn to the scale. Also, the dimensions of the various features are arbitrarily expanded or reduced for clarity. Included in the drawings are the following figures.

DETAILED DESCRIPTION OF THE INVENTION

Figure 1:
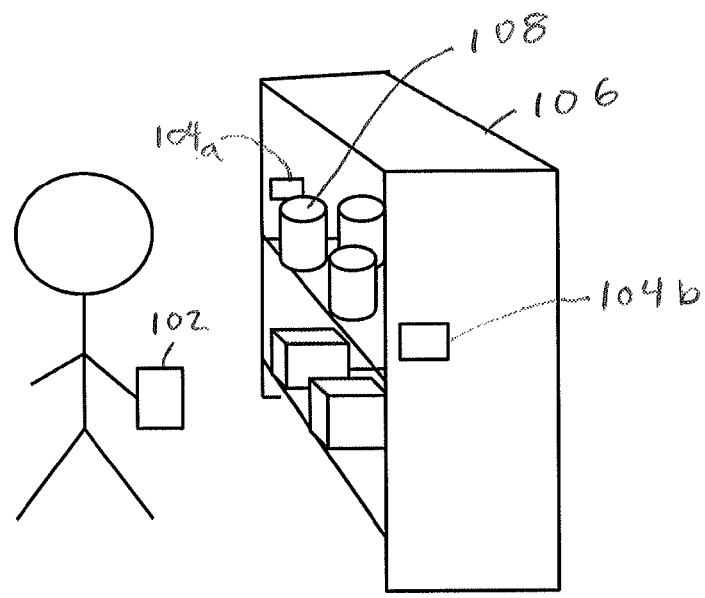
FIG. 1 is a perspective drawing which is useful for describing the context for an example embodiment of the invention.

Proximity aware devices may be used to trigger specific actions based on a sensed proximity, for example, of a mobile device to a transponder. The materials that follow describe proximity awareness in the context of a retail establishment. It is contemplated, however, that the underlying technology has broader application including, without limitation, security, enterprise workflow, gaming and social interactions.

In one form of proximity awareness, a client device registers its location or communicates with a server system via NFC, Quick Response (QR) code or a manual operation such as scanning a customer loyalty card. These systems have limited proximity awareness as they require actions by the clients to register their devices. In addition, the equipment used to register the client devices tends to be relatively expensive and, so may be installed in only a few locations.

Other forms of proximity awareness may employ surveillance systems, such as video cameras, wireless local area network (WLAN) access points and applications and/or connected sensors to determine the location of one or more client devices in a monitored area. These systems also employ relatively expensive technology and may also require sophisticated software, such as image analysis software that tracks particular clients as they move about the covered area. Furthermore, many of these systems are based on the infrastructure determining the presence and location of a device rather than the device determining its proximity with respect to the infrastructure.

An example proximity system according to the subject invention employs a plurality of transponders each of which may transmit or receive a signal to or from a client device. Each transponder may be associated with a region of interest. A region of interest may be a particular region of an area covered by the transponders, for example, a portion of a shelving unit in a retail store. The transponder associated with the region if interest may be used to define one or more zones. Zones are defined relative to one or more of the transponders, as described below. Signaling between the client device and the transponder(s) may establish at least a probability of the client device being in a particular zone relative to the transponder. Each of the zones may be considered to be a range of locations relative to each transponder indicating, for example, respectively different levels of proximity between the client device and the region of interest in the covered area.

Although the embodiments described below employ fixed transponders, it is contemplated that mobile transponders, possibly with MEMs sensors (not shown), may be used in some embodiments of the invention. For example, a transponder may be associated with a person and conditions and actions may be specified for or by a client device based on a zone of proximity to the person and transponder status as indicated by the MEMs sensors. This type of transponder may be useful for social interactions or gaming in which, for example, one user being proximate to another user is a condition for an action that conveys benefits or penalties to one or both users.

The system may associate one or more actions with each of the zones of each of the transponders and may also associate conditions that trigger the actions. In addition, the system may include functionality by which the conditions for actions associated with the zones may include a number of factors including, without limitation, the zone currently occupied by the client, zones proximate to the currently occupied zone, zones currently occupied by other clients, the immediate or long-term history or demographics of the client, the current status or environment of the covered area and/or the status or environment of an area surrounding the covered area. A condition is a set of factors that are evaluated to determine if an action is to be triggered. The input values to the condition are data on the factors to be considered and the output of the condition is a Boolean value, yes or no. As described below, factors to be considered by a condition may be defined by the server or may be derived by the client device from the sensed transponder signals and/or the immediate past history of the user, using algorithms provided by the server but executed by the client device, in real time, when it is in, or proximate to the zone of interest. A condition and action may not necessarily correspond to a region of interest associated with the zone currently occupied by the client device. For example, in order to allow the user sufficient time to consider a promotional offer it may be desirable for a condition to trigger an action presenting the offer as the client device approaches the zone corresponding to the promoted product. This may be, for example, an adjacent or nearby zone. Such a condition may also include sensed data on the clients speed and direction.

FIG. 1 is a perspective drawing of a portion of a self-serve retail venue, such as a grocery store, including a shelf unit 106 holding products 108 to be sold. Transponders 104a and 104b are coupled to the shelf unit such that their signals may be captured or sensed by client devices 102. The client devices 102 may determine the zones based on the signals captured from the transponder device(s) 104 or may send information on the signals captured from the transponders 104 to a server (not shown in FIG. 1) which may use the transmitted signals to send zone information to the client devices.

In an alternative embodiment of the invention, the transponders 104, instead of being beacon transmitters, may be receiving devices that receive signals from the client devices 102 and send identifying information about the client device and signal strength measurements to the server so that the server may determine the zones relevant to the client device 102 that is proximate to the transponder or transponders from which it received the client's information. The transmitted signals may be radio frequency (RF) or ultrasonic signals or they may be light signals having wavelengths within the infrared (IR), visible or ultra-violet (UV) ranges. Example transponder, client and server devices are described below with reference to FIGS. 5, 6 and 7.

It is contemplated that the determination of the client zone may be performed by the client device or by the server. When the zone is determined by the client device, the server may, for example, download parameters that define one or more zones, for example, a zone map with zones defined by predetermined relationships between the transponder and the client device. The client device may process the sensed transponder signals to determine its zone based on transponder identifiers, signal characteristics and the downloaded parameters. In another alternative, the server may not download the zone map but, instead, download parameters delimiting a set of zones associated with the transponder IDs. These parameters may be, for example, a set of distance ranges for each zone or a set of parameters defining a probability distribution that may be used to estimate the zone occupied by the client device. The client device 102 may then estimate the zone based on these parameters and characteristics of the sensed transponder signal(s).

This analysis may, for example, include comparing the signal characteristics to one or more probability distributions to determine respective probabilities that the client device is in each zone. The zone having the highest probability is then selected as the estimate. The probability distributions may be generated by applying empirical measurements to a predetermined distribution or by modeling a frequency distribution generated by multiple measurements. This zone determination and, optionally, the corresponding signal characteristics may be sent to the server 300 to refine the probability distribution or to build a zone map. The zone determinations and corresponding signal characteristics may be verified at a later time, for example, according to the items purchased by the user, as detected at checkout, to provide a ground truth that is used to develop the zone probability distributions.

Figure 2:
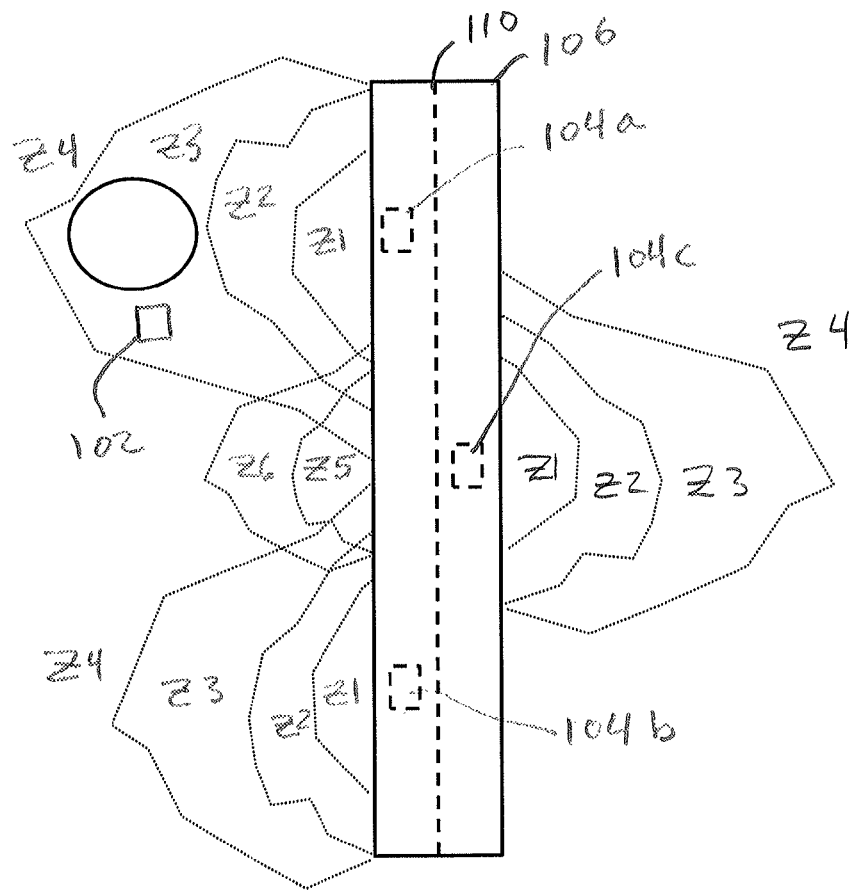
FIG. 2 is a top view drawing of the context shown in FIG. 1 that is useful for describing the operation of the example embodiment.

FIG. 2 is a top-view drawing of the shelf unit shown in FIG. 1 which shows example zones defined for three transponder devices, 104a, 104b and 104c. Each zone defines a range of distances between the client device 102 and the transponder 104. The example zones range from Z1, which is closest to the transponder 104 (e.g. from 0 to 1 meter), zone Z2 is next (e.g. 1 to 3 meters) followed by zone Z3 (e.g. 3 to 5 meters) and finally, zone Z4 (e.g. greater than 5 meters). It is contemplated that zones may be defined for each transponder and that the number of zones and distances defined by each zone may vary.

The zones may be defined by the identity of the transponder device 104 and signal characteristics of the sensed signal, including, without limitation, signal strength (e.g. RSSI), signal round trip time (RTT), signal phase, signal quality and/or time of signal arrival. The example zones shown in FIG. 2 are defined by ranges of signal strength. As described below, each client device 102 monitors the signal characteristics of nearby transponder devices 104 to estimate the zone or zones that it currently occupies. Although FIG. 2 shows the zones as being defined by signal contours, it is contemplated that they may be defined by probability distributions of the signal characteristics.

As shown in FIG. 2, the example client device 102 is in zone Z3 of transponder 104a and in zone Z4 of transponder 104b. The example shown in FIGS. 1 and 2 uses a grounded metal shelving unit 106 having a center divider 110 which may greatly attenuate the signal provided by transponder 104c as it is sensed by client device 102 on the opposite side of the shelf. Consequently, client device 102 may be associated with a remote zone, if any of transponder 104c.

A set of zones may be associated with a particular transponder or with a group of transponders. For example, zones Z5 and Z6 may be defined by ranges of signal characteristics of both transponder 104a and 104b. As described above, because the metal shelving attenuates the signals from transponder 104c zones Z5 and Z6 may alternatively be remote zones of that transponder. Typically, zones are defined for a single transponder and the intersection, union or the complement of the intersection of multiple zones may itself define a zone. It is also contemplated that zones may be defined by any combination of signals sensed by or broadcast from multiple transponders.

In an exemplary embodiment of the invention, the zones may be defined dynamically as the transponder signals are captured by the client devices or manually during an initialization step in which an administrator, for example, a store employee, obtains a set of signal characteristic readings for each transponder or group of transponders at various distances from respective regions of interest covered by the transponder(s) to define the zones. Alternatively, the zones could be defined based on known signal strengths of the signal provided by the transponder or through crowd-sourcing based on a dataset generated from the interactions of multiple users with the transponders. Definitions of these zones may be generated by the client devices or by the administrator and may be stored on the server. When the zone definitions are stored on the server, they may be provided to the client devices 102 either in response to a query from the client device or as an initial download of zone information. The zone information may be downloaded piecemeal, in response to a query, or information about all of the zones in the covered area may be downloaded in a single operation prior to, or upon the user entering the covered location. This downloaded zone information may be stored in the cache memory of the client device 102.

Each of the zones shown in FIG. 2 may be associated with a respectively different set of conditions and actions, as described below. In addition to the zones and the transponders, the server may take into account other factors which may influence the propagation of signals to or from the transponders 104, such as, without limitation, the sensitivity of the client device, the relative humidity, the number of people near the tags and the constitution of objects proximate to the transponders such as the shelf unit 106 and the products 108. These factors define the zone context which is used by the server or client device to further refine a prediction of the zone currently occupied by the client device 102.

In addition to zone context, the server may also take into account context concerning each transponder 104. Factors defining the transponder context include, without limitation, battery power, and/or the status and location of the transponder.

The system may also take into account context information related to the client device such as, without limitation, its orientation, speed of movement and altitude. As described below, the client device context may also include user profile information such as gender and age as well as recent and long term history. In one exemplary embodiment, the context of the client device may be generated using sensors such as, for example, an accelerometer, a pedometer, a compass and an altimeter. It is contemplated that these sensor may be microelectromechanical sensor (MEMS) devices integral with the client device.

Figure 3:
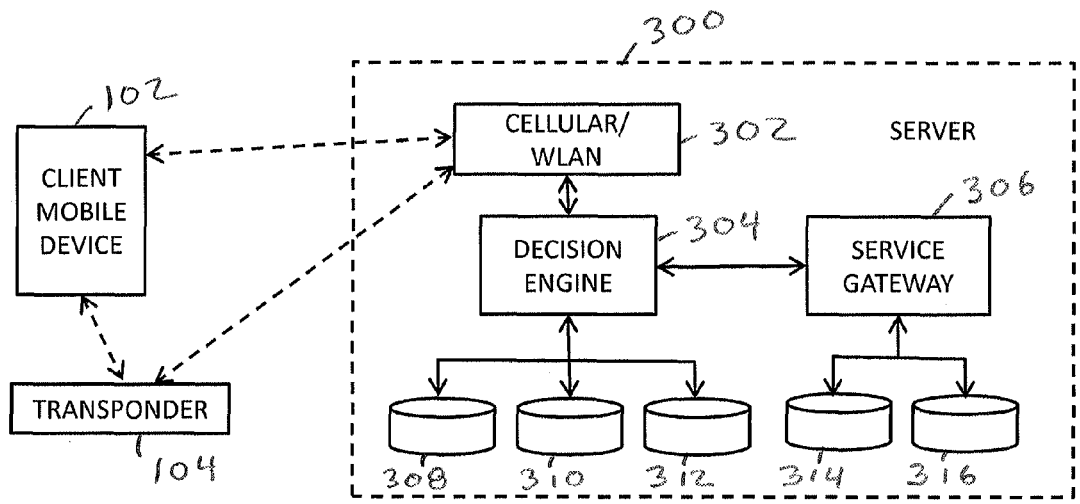
FIG. 3 is a block diagram illustrating details of components of a system including an example embodiment.

FIG. 3 is a block diagram which illustrates the three basic components of the location system, the client device 102, transponder 104 and server 300. The transponder may include a short-range RF communications system, such as Bluetooth (and in particular, Bluetooth Low Energy (BLE)) and/or NFC, a low-power optical system operating in a wavelength range from IR to UV and/or a low-power ultrasonic system. The transponder may also include an optional communication system such as a wired network interface, or a WLAN (e.g. IEEE 802.11 WiFi) or mesh (e.g. IEEE 802.14 Zigbee, Bluetooth or BLE) network. As described below, in one embodiment of the invention the transponders 104 may communicate with the server 300 via the mesh network connection in which each transponder 104 relays messages to and from other transponders until a transponder proximate to the server 300 communicates the message to the server. The client device 102 may, for example, be a mobile device such as a smart-phone that includes a low-power communications system which is compatible with the transponder. The client device may also include WLAN, mesh and/or cellular communications capabilities so that it may communicate with the server 300 either directly or through the optional mesh network. The transponders 104 of a robust location system may include multiple short-range communications elements to provide maximum compatibility with the client devices 102.

The example server 300 may include, for example, a WLAN, mesh and/or cellular communications system 302, a decision engine 304 and a service gateway 306. The decision engine 304 and service gateway 306 may be implemented as software executing on a processor coupled to local databases. As described below, the service gateway 306 may include a connection to one or more remote databases and, thus, may include a network interface that links the server 300 to databases on a local-area network (LAN), wide area network (WAN) or a global information network such as the Internet®.

In the example embodiment shown in FIG. 3, the decision engine is linked to three databases, a database 308 that describes the zones associated with the transponders, a database 310 that defines the context around each zone and an actions database 312 that associates conditions and actions with each zone of each transponder. It is contemplated that, rather than being separate databases, this data may be organized as three tables within a single database.

In addition to the local databases, the server may access databases 314, through the service gateway, that may include data to be used to generate conditions and/or actions from a company mainframe and/or third-party sources, such as profiles associating clients with locations and actions based, for example on client demographics, seasonal factors or environmental factors.

In an enterprise corporate embodiment, for example, project based information, such as corporate databases, event calendars and team profiles, may be retrieved from database 314 and associated with conditions such that, when a sanctioned user approaches a zone corresponding to a promoted project location, information about that project may be presented to the user. As with other embodiments of the invention, the condition of the user approaching a zone, entering the zone or dwelling within the zone for a predetermined amount of time may trigger the action of presenting the project information.

In addition, in a retail environment, the server may access information on the particular customer from a customer database 316, for example, a customer loyalty program. Although the databases 308, 310 and 312 are shown as being local to the server 300 and databases 314 and 316 are shown as being remote and accessed through the service gateway, it is contemplated that any or all of the databases may either be local to the server or remote. Example operations and interactions of the client device 102, transponder 104 and server 300 are described below with reference to FIGS. 8, 9 and 10.

As shown in FIG. 3, the client device 102 communicates with the transponder 104 and the server 300. In one exemplary embodiment, the transponder 104 transmits data to the client device 102 and does not communicate with the server. In another embodiment, the transponder 104 receives data from the client device 102 and transmits the client information to the server 300.

Figure 4:
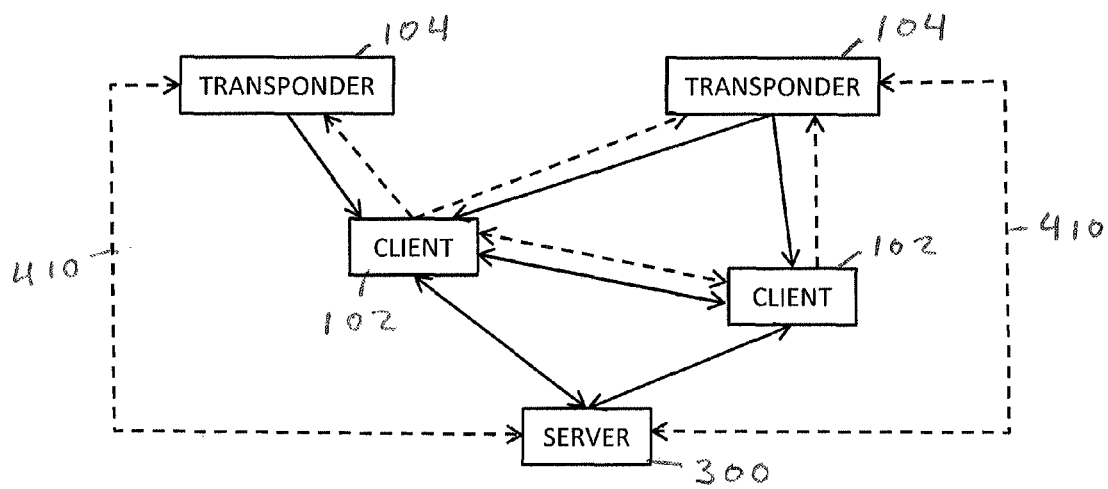
FIG. 4 is a functional block diagram that is useful for describing interaction among the component parts of the system shown in FIG. 3.

FIG. 4 is a block diagram which is useful for describing the various communications modes of the client devices 102, transponders 104 and server 300. In FIG. 4, the solid lines indicate communications according to one embodiment and the dashed lines indicate another embodiment.

In a first embodiment, the transponders 104 are transmit-only devices each of which periodically broadcasts identifying signals that are sensed by one or more client devices proximate to the transponder. The transponders may be, for example, BLE beacon transmitters that periodically transmit respective messages in the BLE Advertisement channels (BLE advertisement messages). It is contemplated, however, that other types of transponders may be used and that other types of signals may be broadcast by the transponders 104. Each client device 102 captures the identification data from the transponders 104 and either processes it internally or transmits it to the server 300, along with data identifying the client device 102. In addition, as described below, the beacon devices may broadcast other data, for example, the broadcast signal strength, that may help the client device 104 determine its zone membership relative to the transponder. Alternatively, each client device 102 may establish a dedicated link with the server 300 when it enters the covered area so that identification data for the client device 102 is sent to the server 300 only once.

As shown in FIG. 4, optionally, each client device may also communicate with other client devices using either a short-range communications functionality (e.g. BLE), a cellular (e.g. push-to-talk (PTT)), WLAN (e.g. WiFi) or mesh (e.g. Zigbee) functionality. As described below, this communication may be limited to exchanging data that each client device receives from the server in order to reduce the volume of client/server communications.

In a second example embodiment, the each of the transponders 104 is configured to receive short-range signals (e.g. BLE) signals broadcast by the client devices and to send its identity and information on the detected client devices to the server, for example, via network 410. The information sent may include a client device identifier and characteristics of the received signal. Network 410 may be a wired network or a wireless network such as a WLAN or a mesh network. In this embodiment, the server may determine the zone corresponding to the transponder ID based on the signal characteristics of the short-range signal received by the transponder 104 from the client device 102. The server 300 communicates with the client device to identify its current zone and to send actions and conditions associated with the determined zone and other zones located near the determined zone.

Figure 5:
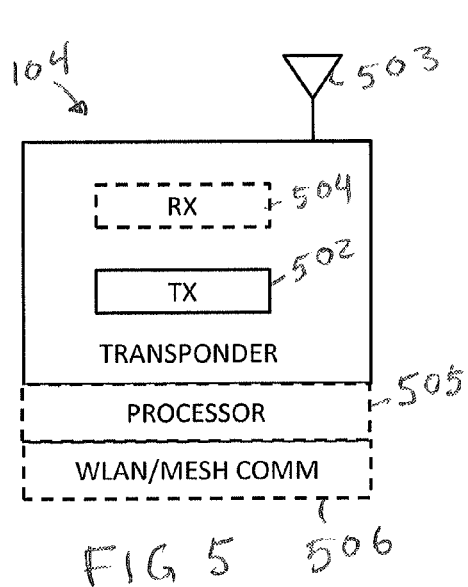
FIG. 5 is a block diagram of an example transponder suitable for use with exemplary embodiments of the invention.

FIG. 5 is a block diagram of a transponder device 104 suitable for use with the subject invention. The device includes a transmitter 502, an antenna 503, an optional receiver 504 an optional network interface (e.g. a WLAN or mesh transceiver) 506. The antenna may be used for both the transmitter 502 and WLAN communications module 506 or separate antennas may be used. In one exemplary embodiment, the transmitter 502 is a BLE beacon transmitter. This device sends a BLE advertisement message that includes the label of the transponder device. The BLE advertisement message may be used to communicate limited information to another BLE device even though the devices are not paired.

In the first embodiment of the invention described with reference to FIG. 4, the transponder 104 includes only the transmitter 506 and antenna 503. Although it is not shown in FIG. 5, the transponder also includes a power source, for example, a lithium battery. Because it periodically transmits a low-power signal, the example transponder 104 may operate for several years using the battery.

In the second embodiment shown in FIG. 4, the transponder 104 may include the antenna 503, receiver 504, a processor 505 and network interface 506. Depending on the network interface used, the transponder 104 used in the second embodiment of the invention may use a different power source, for example, a wired power source. In this embodiment, it may be desirable to mount the transponders on the ceiling above the shelf units 106 to facilitate wire connections for the network and power source. It may also be desirable for such ceiling-mounted transponders to broadcast a directional signal so that, in an example retail implementation, client devices predominantly capture signals from each transponder on one side of a shelf unit. In this example embodiment, the transponder 104 receives short-range signals (e.g. BLE advertisement messages) from client devices 102, extracts data, measures signal characteristics, formats the data and signal characteristic measurements and transmits the formatted information to the server 300.

Figure 6:
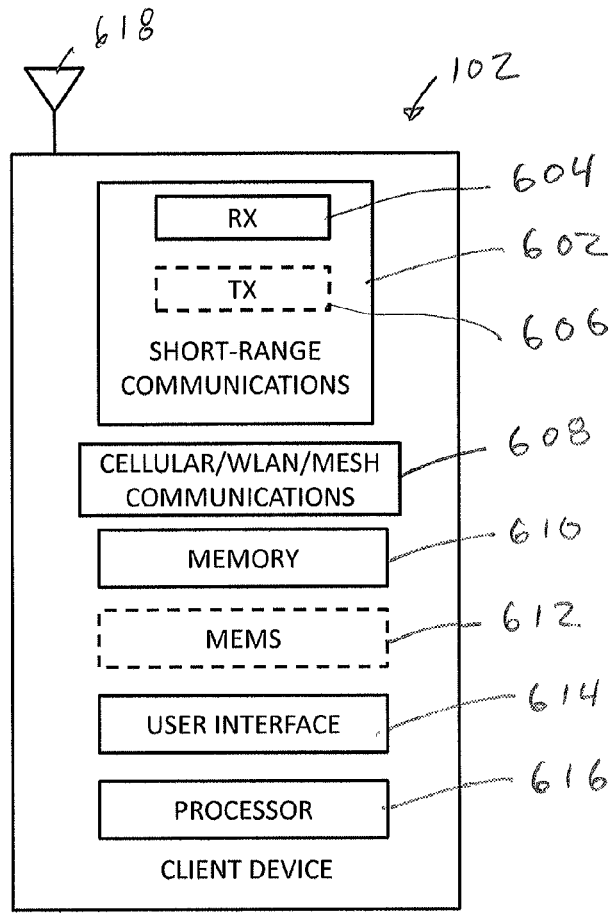
FIG. 6 is a block diagram of an example client device suitable for use with exemplary embodiments of the invention.

FIG. 6 is a block diagram of a client device 102 suitable for use with the subject invention. The client device, may, for example, be a conventional smart phone running an application that performs the functions described below with reference to FIGS. 8 and 9. The example client device, includes a short-range communications module 602 having a receiver 604 and an optional transmitter 606, a cellular/WLAN/mesh communications module 608, a memory 610, optional MEMS devices 612, a processor 616 and one or more antennas 618.

The receiver 604 of the example short-range communications module 602 senses the low-power signals broadcast by the transponders 104 via one of the antennas 618. Information about the sensed signals, such as transponder ID, RSSI, RTT, time of arrival and/or signal phase may be digitized and stored into the memory 610. In an exemplary embodiment of the invention, the digital values may be analyzed by the processor 616 (i.e. analyzed and compared to zone definitions received from the server 300) to determine the current zone location of the client device.

The cellular/WLAN/mesh communications module 608, under the control of the application, communicates information with the server 300. If the communications module 608 is a mesh communications module, the transponders 104 may also include mesh communications capability such that the client device 102 communicates with the server 300 though the transponders via a mesh network. Optionally, the module 608 may also communicate with other client devices 102 using the communications module 608, for example, to share information obtained from the server. Alternatively, communication between client devices 102 may be implemented using the short-range communications module 602.

The example client device 102 includes optional MEMS devices 612, for example, an accelerometer, a gyroscope, a compass, a pedometer and/or a barometer. As described below, with reference to FIG. 9, the MEMS devices may be used to gather information on movement of the client device. This information may be processed locally by the processor 616 or it may be sent to the server 300 for processing. As described below with reference to FIG. 9, movement information may be used to modify the actions presented to the client device.

One way in which actions may be presented to the user is via the user interface 614. The interface may include, for example, a display screen (not shown) and an audio output such as a speaker or a headphone jack (not shown). The user interface may also include an input device, such as a touchscreen (which may be the same as the display screen) and/or push-button switches such as a keyboard. The user interface of the client device may also include a camera (not shown) or bar-code scanner (not shown) that a user may employ to scan barcodes or QR codes of items in one or more regions of interest associated with a zone.

Figure 7:
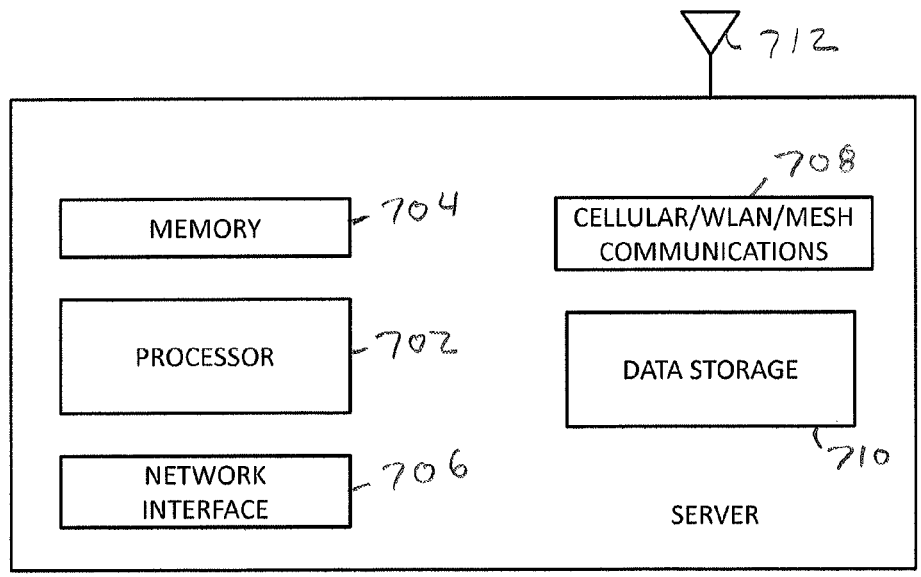
FIG. 7 is a block diagram of an example server suitable for use with exemplary embodiments of the invention.

FIG. 7 is a block diagram of an example server 300. The example server includes a processor 702, memory 704, network interface 706, cellular/WLAN/mesh communications module 708 and data storage 710. As described above with reference to FIG. 3, the server may access multiple local databases and networked databases to implement the decision engine functions. In this example, the local databases are implemented in the data storage 710 and the networked databases are accessed through the network interface 706. The network interface 706 may be configured to couple the server 300 to a local area network (LAN), wide area network (WAN) and/or a global information network, such as the Internet.

The example server 300 communicates with the client devices using the cellular/WLAN/mesh communications module 708 and, in the second embodiment described above with reference to FIG. 4, communicates with the transponders 104 via the network interface 706 or the WLAN or mesh communications module 708. The Cellular/WLAN/mesh communications module may use one or more antennas 712 to communicate with the client devices 102 and/or the transponder devices 104.

Figure 8:
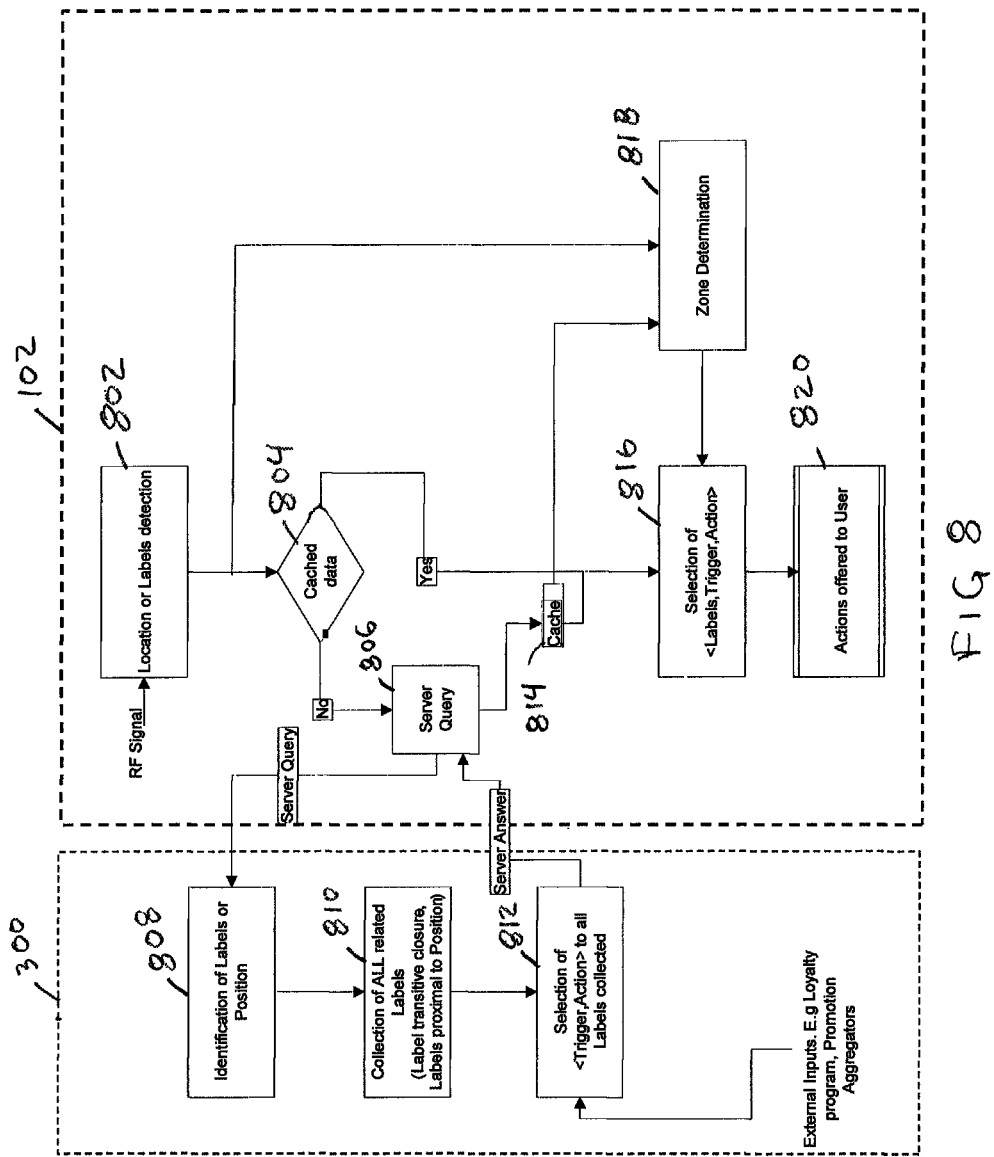
FIGS. 8 and 9 are flow-chart diagrams that are useful for describing the operation of example embodiments of the invention.
Figure 9:
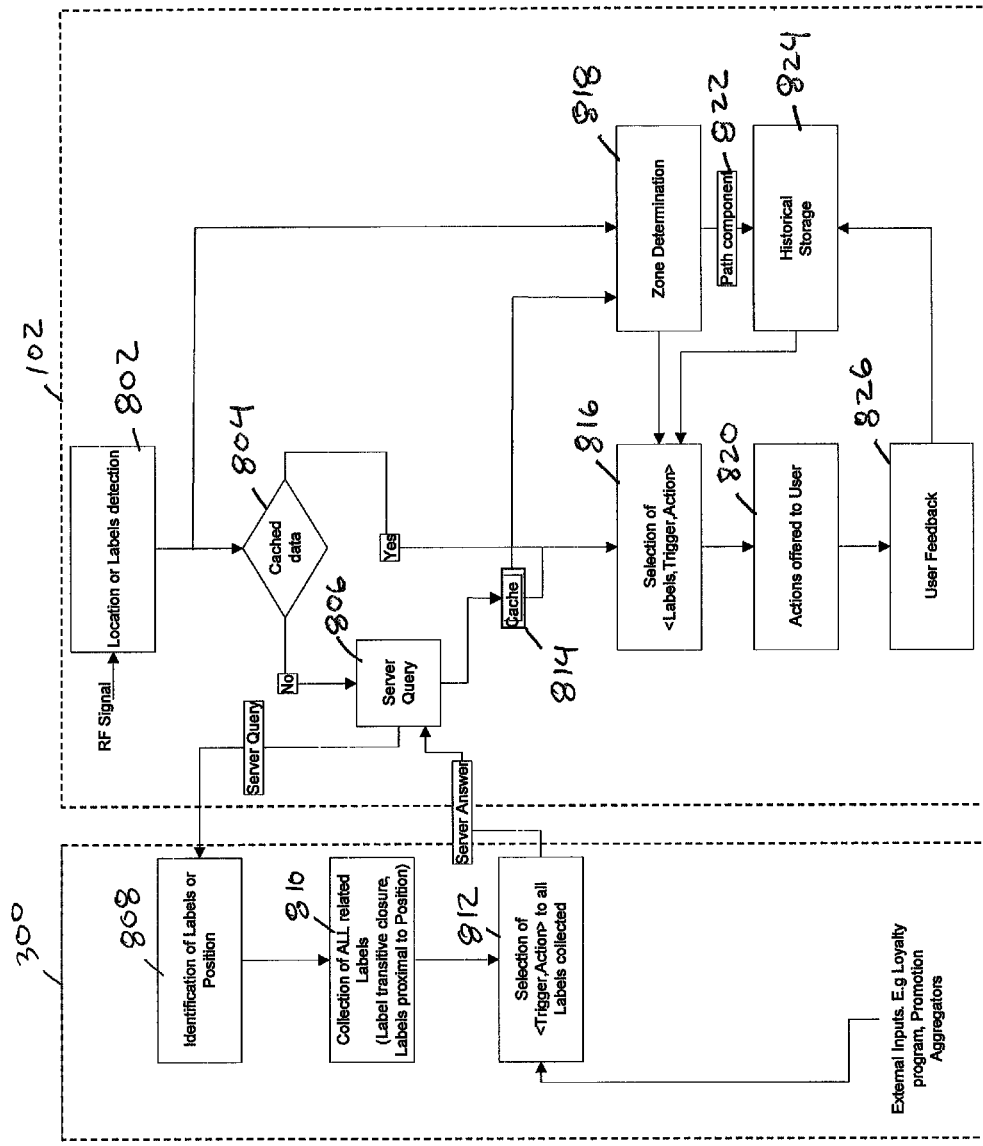
Figure 10:
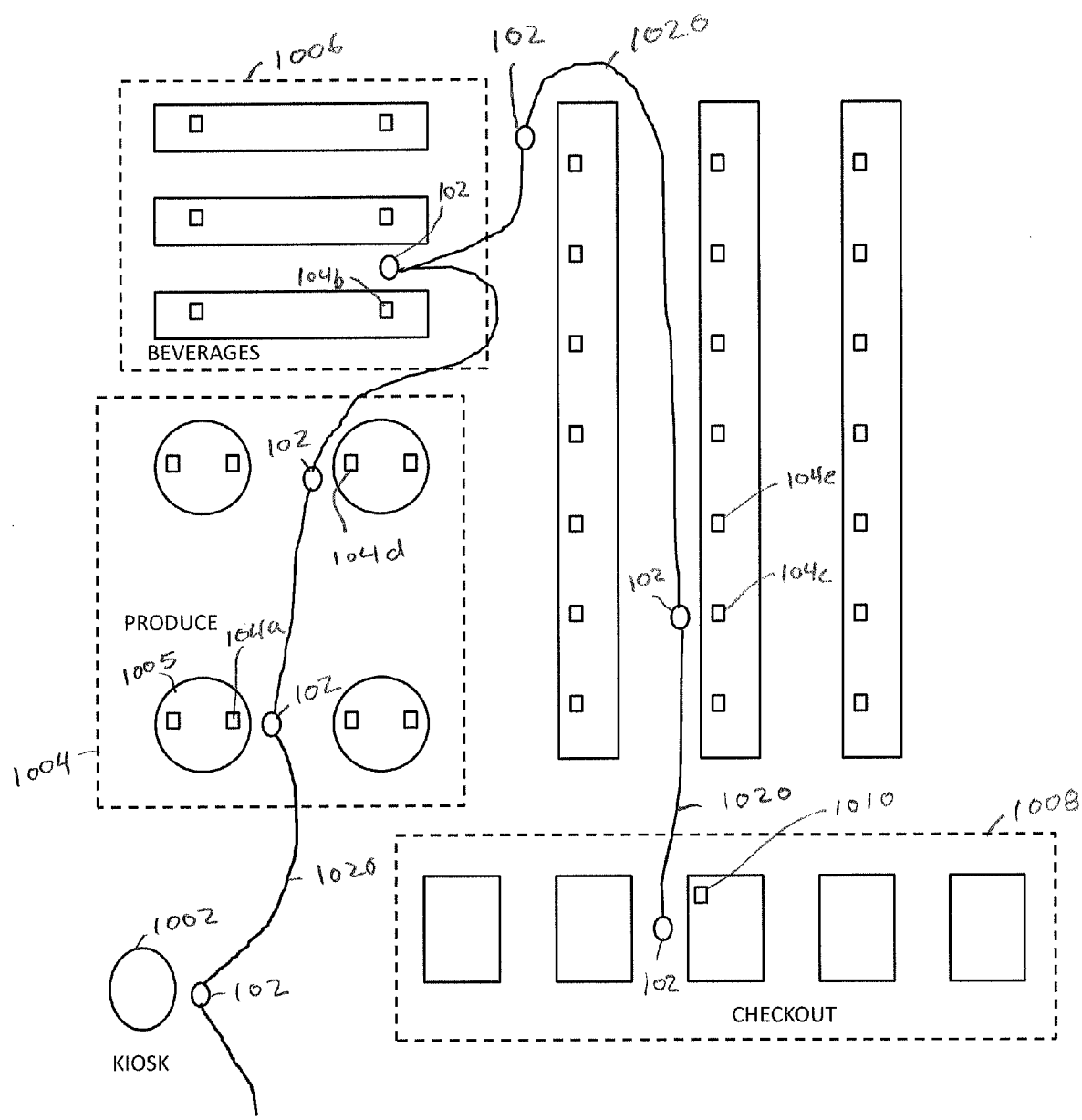
FIG. 10 is a top plan view of a retail venue that is useful for describing the operation of a system including an embodiment of the subject invention.

FIGS. 8 and 9 are flow-chart diagrams that illustrate exemplary interactions of a client device 102, transponder device 104 and a server 300. To provide context, the operation of the devices is described in terms of a self-serve retail store. In a particular example, the store is a grocery store and the user is buying items on a shopping list. FIG. 10 is a top-plan view of the store 1000 which is useful for describing the example interactions. Although the system is described in terms of transactions at a retail store, it is contemplated that it has much broader application to other enterprises in which a user's level of proximity to a transponder associated with a particular region of interest may trigger an action, linked to the region of interest, which action is then presented to the user.

In this example, the shopping list may be generated 1) by the user on the client device 102 prior to entering the store 1000, 2) automatically when the user enters the store based on the user's past buying history or 3) by the system, based on user demographic data, current trends and/or current promotions. For automatic generation of the list, the system may use information about the user's past purchases contained, for example, in a customer loyalty database 316, shown in FIG. 3. As shown in FIG. 10, the user may register the client device at a kiosk 1002 upon entering the store. This registration may, for example, occur through the short-range communications module 602 or the cellular/WLAN/mesh communications module 608. In addition to registering the client device, the kiosk 1002 may allow the system to calibrate the short-range communications receiver 604 (shown in FIG. 6) of the client device 102. This may be achieved, for example, by activating a reference transponder when the client approaches the kiosk to register. When the client registers with the kiosk, the client device 102 may be in a known range of distances from the reference transponder. Based on a measurement of the transponder signal, the client device may be assigned an adjustment to the sensed signal characteristic of other transponders in the store that will produce a more accurate zone estimate.

As an alternative to registering the client device, at the kiosk 1002, the user may automatically register by joining the store's WLAN network or prior to entering the store by accessing an application associated with the company that operates the store. If the user is not a member of the store's customer loyalty program or does not want to be identified, the registration step may be skipped. In this scenario, the client device 102 may connect with the server either via the short-range communications module 602 or the cellular/WLAN/mesh module 608 and the server 300 may assign a temporary identifier to the client device 102, through the application running on the processor 616 of the client device 102. In these alternative embodiments, the client device may not be calibrated or may be calibrated upon entering a known zone of another transponder in the store. For example, if the user stops for a preset amount of time, it may be assumed that the user has selected an item from the shelf and, thus, entered zone 1 for a particular transponder. The sensed signal characteristic during this event may be used to calibrate the short-range receiver of the client device 102.

In the example scenario, each of the transponders has been assigned a label. This label may be associated in the server with a region of interest and thus, with a class of items. When the client device 102 passes by a transponder 104, it senses the label. If the client device does not have cached data for the sensed label, it may provide the label to the server 300. The server 300 looks up the label and retrieves zone definitions for the sensed transponder 104 as well as for other nearby transponders. This information may then be sent to the client device 102. Alternatively, as described above, the client device 102 may have cached the label data previously. As described above, the zone definitions may be in terms of probability distributions based on distance ranges from the transponder or ranges of signal characteristic measurements.

The server 300 also retrieves and transmits conditions and actions associated with the zones. Conditions may be related to the items associated with the zone, for example a promotional offer made only to users of the proximity awareness system for an item in the region of interest associated with the transponder. A condition may also relate to the environment in the store or outside of the store. For example, if the store is busy, a particular promotional offer may be suspended as being unnecessary. Also, the server may make an offer that is conditioned on the weather. For example, this condition and action may indicate that if the weather is rainy, the client is reminded to purchase an umbrella when the user enters a zone defined for a transponder proximate to umbrellas. Checking environmental conditions may occur in the server, in which the zone, condition, action triplet may be stored, or it may be left to the application in the client device 102 that may, for example, obtain the information by accessing data provided by a weather application that is also running on the client device 102.

Conditions may also relate to information concerning the status and history of the client device 102, for example, that the client device is in or has visited a particular set of zones or is moving at less than a particular speed. Conditions may also relate to the demographics of the user, data on the customer from a loyalty database and the current state of the environment. Based on this information, the client device 102 checks the transponder label, its current zone, zones it previously visited and any zone it may be approaching against a set of conditions. These conditions may include the shopping list or one or more condition defined by the server 300 or by the server and the client device 102. The client device may trigger an action if at least one condition is satisfied.

As described above, when client device 102 receives the transponder ID for transponder 104a, the server 300 may transmit data for the transponder 104a and for other nearby transponders, such as transponders 104b and 104d. The application may store this data in a cache memory on the client device 102 for use when the user passes by these transponders.

The client device 102 uses the information received concerning transponder 104a to determine whether one of the actions received from the server is triggered by the conditions being met. If, for example, an item on the shopping list is proximate to the transponder 104 and if the client device 102 is moving at the speed set in the condition and is within a predetermined zone defined by the condition, then the client device may perform an action to alert the user, for example by vibrating or emitting an audible chime and displaying the shopping list with the item highlighted. Each zone may have multiple condition sets and multiple actions associated with it. For example, in addition to alerting the user that an item is on the list, the store 1000 may have a promotion on another item associated with the zone and offer the user an e-coupon if they purchase the item.

With reference to FIGS. 8 and 10, the client device 102, passing through the produce section 1004 senses, at step 802, the label of the transponder 104*a* which is associated with the fresh-fruit table 1005. This transponder label is sent to the zone determination block 818. The client device 102, at step 804, then determines if it has cached data for the transponder 104*a*. If it does, the client device examines the cached data against the sensed signal characteristics and determines, at step 818, which zone or zones it is in. Also at step 818, the client device 102 retrieves, from the cache, any conditions and actions associated with the determined zones. At step 816, the client device 102 examines the conditions to determine if any action is triggered. In this example, the conditions may include the speed of the user (i.e. if the user is moving at 2 kph or less), the zone occupied by the user (i.e. if the user is within zone 1, 2 or 3 as shown in FIG. 2), and if an item associated with the zone (e.g. bananas) is on the shopping list. If these conditions are met, the client device may trigger an action that causes the client device to buzz and chime and to display the shopping list with the word "bananas" highlighted. If any of these conditions is not met, the client device may not trigger the action. For example, if the user is moving quickly through the produce section it is likely that he/she is not looking for bananas but, instead, is looking for other items on the list. The triggered actions are presented to the user at step 820.

In the above example, the client device sensed a single transponder 104*a* and the zones, conditions and actions presented to the user were based only on the label of that transponder. It is contemplated, however, that the client device 102 may concurrently sense multiple transponders and provide the labels of both transponders to the server 300. In this instance, the client device may use signal characteristic data from both transponders to identify zones, such as zones Z5 and Z6, shown in FIG. 2, that are defined by multiple transponders. These zones may have conditions and actions related to, or independent of the conditions and actions associated with the zones defined for the individual transponders. As described above, estimates of zone membership may be determined based on one or more probability distributions generated in the client device based on parameters provided to the client device by the server. These parameters may include, for example, values for a mean and standard deviation of a Gaussian distribution for each of the zones associated with each of the transponder labels retrieved by the server.

If, at step 804, the client device does not find cached data for the label of transponder 104*a*, the client device 102, at step 806, sends a query to the server, including the label of the sensed transponder device 104*a*. The server may also receive identifying information for the client device 102. The server, at step 808, searches its local databases for the label to find its zone information. Next, at step 810, the server 300 searches for all labels that are related to the label received from the client device 102. These labels may be, for example, associated with similar items or they may be labels for transponders proximate to the sensed transponder 104*a*. Once the set of labels is determined and their zone data retrieved, the server, at step 812, may search its local database and networked databases to determine, conditions and actions that are associated with the zones defined by the collected transponder labels and the user ID provided by the client device 102. The collected information is sent by the server 300 to client device 102 at step 812 as the server answer to the query.

The data from the server answer is stored in the cache 814 of the client device 102 which is linked to the label, condition, action selection at step 816 and the zone determination at step 818. At step 820, using the cached data, the client device 102 determines its current zone, analyzes the conditions and triggers any associated actions as described above.

The method shown in FIG. 8 illustrates a static decision engine where the conditions and actions for each zone of each transponder are determined by the server based on the current position of the client device 102 and data in the local and networked databases. FIG. 9 illustrates an alternative dynamic decision engine in which the conditions provided by the server may be augmented by the application running on the client device. In this embodiment, the client device may modify any of the conditions provided by the server based on the user's past behavior including the path followed by the user.

For the sake of brevity, only the differences between the processes of FIGS. 8 and 9 are described, with reference to FIG. 10. One of the differences with respect to the server 300 is that the conditions stored in the database are augmented to allow historical data to be considered. In the client device, after the zone determination at step 818, the device 102 calculates a segment of the path 1020 traversed by the user and stores it into a historical storage database 824 local to the client device. The client device 102, at step 826, may also receive feedback from the user, as described below, and provides this feedback to the historical storage 824. The data in the historical storage is used in step 816 to evaluate the augmented conditions in order to select conditions and actions for the identified labels. The historical data may also include data from the MEMs sensors 612 of the client device 102. This data may be linked to particular transponders 104 or may be stored as a part of the path 1020 followed by the user.

The augmented conditions provided by the server 300 may, for example, associate related products that are found in different parts of the store. For example, beer and chips. In this instance, the augmented condition may cause the client device 102 to take into account the user's conduct near the transponder associated with beer in one of the augmented conditions that is linked to the transponder label associated with chips. For example, as shown in FIG. 10, the user, after passing transponders 104*a* and 104*d* travels to and stops in front of transponder 104*b*. The stopping of the client device 102 may, for example, be sensed by the MEMs devices 612, shown in FIG. 6. Based on this stopping, the system infers that the user has selected beer from the shelf for purchase.

The example client device 102 may, for example, store each of the zones traversed by the user. In this example, the user may move from zone 4 to zone 1 at transponder 104*b*. The client device 102 records these zones in the historical storage 824. Later along the path 1020, the user may be approaching transponder 104*c* which is associated with chips. The augmented condition for the label associated with transponder 104*c* may indicate that if the user has entered zone 1 at transponder 104*b* then an action should be presented asking the user to purchase chips. This augmented condition associates the user entering zone 1 near transponder 104*c* and the inferred purchase of beer to satisfy an augmented condition that triggers an action asking if the user also wants to purchase chips.

In this example, as the client device 102 senses the label associated with transponder 104*e*, it receives conditions and actions for label 104*c* as well. The client device examines the historical storage to interpret the augmented condition associated with the label linked to transponder 104c. In this case, that the user has entered zone 1 near transponder 104b and stopped. When the user first senses transponder 104c (e.g. first enters zone 4), the client device 102 selects conditions and actions that may cause the client device 102 to emit a chime and display a message asking the user about the purchase of a salty snack such as potato chips, corn chips or pretzels.

As described above, the client device also receives user feedback, provided, for example, via the user interface 614 of the mobile device 102, as shown in FIG. 6. This feedback may be, for example, refusing or ignoring a presented offer. If the historical data indicates that the user tends to accept or reject a particular offer, the client device may consult this data to determine whether a particular offer is to be made.

User feedback may also be obtained when the user processes purchases through the checkout counter 1008. The server may locate the client device 102 at the checkout counter 1008 using a device 1010. The device 1010 sends information on the user's actual purchases to the client device for inclusion in the historical storage 824. This device may be, for example, a transponder 104 that is sensed by the client device and its label and signal characteristics sent to the server 300. In this instance, rather than sending zones, conditions and actions, the server 300 may send the client's purchase inventory, as determined at the checkout counter 1008, to be stored into the historical storage 824. Alternatively, the device 1010 may be able to send information on purchases directly to the historical storage 824 of the client device, bypassing the server 300. This example device may communicate directly with the client device 102, for example, using the cellular/WLAN communications module.

This feedback may also be used to refine the probability distributions used to estimate zone membership. For example a client responding to an action presented in an estimated zone is evidence that the client was in that zone. This information may be collected by the client device 102 and transmitted to the server 300, for example, to refine the frequency distribution used to predict zone membership.

Thus, the dynamic decision engine allows the server to provide augmented conditions to a client device and allows the client device to interpret these augmented conditions based on its internally stored past history to determine whether an action should be triggered. These augmented decisions may be generated by the client device itself or by the client device and the server based on an augmented condition definition previously received from the server or received from the server in response to a specific request.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for triggering actions based on proximity between a client device and at least one short-range transponder in a predetermined area, the method performed by the client device and comprising:
   sensing a signal provided by the at least one short-range transponder, the sensed signal having at least one signal characteristic and including a label defining the short-range transponder;
   associating the label with multiple zones of a plurality of zones, at least one condition and at least one action, wherein the multiple zones are defined in terms of the at least one signal characteristic, and the at least one condition and the at least one action are associated with at least one zone of the multiple zones, wherein associating the label with the multiple zones comprises:
      determining respective probabilities, based on the at least one signal characteristic, that the client device is associated with each of the multiple zones; and
      associating the client device with one zone of the multiple zones corresponding to the highest probability; and
      analyzing the at least one condition based on the at least one signal characteristic of the sensed signal; and
   triggering the at least one action when the client device is associated with the one zone and the at least one condition is met.

2. The method of claim 1, further comprising:
   sending the label to a server; and
   receiving, from the server, data describing the multiple zones, the at least one condition and the at least one action.

3. The method of claim 2, wherein the at least one short-range transponder includes a plurality of short-range transponders in a covered area, each having a respective label, wherein the receiving comprises:
   receiving, from the server, data describing a plurality of zones associated with the plurality of labels; and
   storing the received data in a memory of the client device.

4. The method of claim 3, wherein the plurality of transponders includes all transponders in the covered area.

5. The method of claim 3, wherein the covered area is a retail establishment and each of the plurality of zones defines a level of proximity between the client device and a corresponding region of interest in the retail establishment.

6. The method of claim 1, further comprising:
   determining the at least one zone based on the sensed signal; and
   associating the at least one zone with the at least one condition and the at least one action.

7. The method of claim 3, wherein at least one of the plurality of zones is defined based on respective labels defined for multiple ones of the plurality of short-range transponders.

8. The method of claim 1, wherein each of the multiple zones represents a respectively different range of values of the at least one signal characteristic.

9. The method of claim 8, wherein the sensed signal further includes at least one data value that associates the label with the multiple zones.

10. The method of claim 9, wherein the at least one data value includes a power specification of the signal.

11. The method of claim 1, wherein the at least one signal characteristic includes at least one of signal strength, signal round-trip time, signal arrival time, signal quality and signal phase.

12. The method of claim 1, wherein the at least one short-range transponder includes a Bluetooth Low Energy (BLE) device, and the sensed signal comprises a BLE advertisement message including the label.

13. The method of claim 1, further comprising:
   recording historical data representing activity of the client device in the predetermined area; and
   analyzing the recorded historical data.

14. A client device configured to present actions to a user based on proximity of the client device to at least one short-range transponder in a predetermined area, the client device comprising:

a receiver configured to sense a signal provided by the at least one short-range transponder, the sensed signal having at least one signal characteristic and including a label defining the short-range transponder;
a processor including application software configured to cause the processor to:
associate the label with at least one zone, at least one condition and at least one action, wherein the at least one zone is defined in terms of the at least one signal characteristic, and the at least one condition and the at least one action are associated with the at least one zone, wherein the at least one zone includes a plurality of zones associated with the label;
determine respective probabilities that the client device is in each zone to associate the client device with the zone having the highest probability;
analyze the at least one condition based on the at least one signal characteristic of the sensed signal; and
trigger the at least one action when the client device is associated with the one zone and the at least one condition is met.

15. The client device of claim 14, further including:
a communications interface configured to:
send the label to a server; and
receive, from the server, the at least one zone, the at least one condition and the at least one action.

16. The client device of claim 15, wherein the communications interface includes one of a WLAN interface, a cellular transceiver or a mesh network transceiver.

17. The client device of claim 15, further comprising a cache memory; wherein:
the at least one short-range transponder includes a plurality of short-range transponders positioned within a covered area, each having a respective label;
the communications interface is further configured to receive data describing multiple zones, multiple conditions and multiple actions associated with the each of the plurality of labels and to store the received data in the cache memory; and
the processor is configured to associate respective ones of the plurality of zones with each of the plurality of labels.

18. The client device of claim 17, wherein the covered area is a retail establishment and each of the plurality of zones defines a level of proximity between the client device and a corresponding region of interest in the retail establishment.

19. The client device of claim 14, the software application further configured to cause the processor to:
determine the at least one zone based on the sensed signal; and
associate the at least one zone with the at least one condition and the at least one action.

20. The client device of claim 17, wherein at least one of the plurality of zones is defined based on respective labels defined for multiple ones of the plurality of short-range transponders.

21. The client device of claim 14, wherein the sensed signal further includes at least one data value, and the software application is configured to cause the processor to associate the label with the at least one zone based on the at least one data value.

22. The client device of claim 21, wherein the at least one data value includes a power specification of the signal.

23. The client device of claim 14, wherein the at least one signal characteristic includes at least one of signal strength, signal round-trip time, signal arrival time, signal quality and signal phase.

24. The client device of claim 14, wherein the at least one short-range transponder includes a Bluetooth Low Energy (BLE) device and the receiver includes a BLE receiver.

25. The client device of claim 15, further including a historical storage memory for recording historical data representing activity of the client device in the predetermined area, wherein the at least one condition received from the server is an augmented condition and the application software is configured to cause the processor to analyze the augmented condition in terms of the recorded historical data.

26. The client device of claim 14, wherein the application software is configured to cause the processor to display a message via a user interface, included within the client device, as the at least one action.

27. A method for providing conditions and actions to a client device based on proximity between the client device and at least one short-range transponder in a predetermined area, the method performed by a server and comprising:
receiving a query from the client device;
responsive to the query, associating the at least one short range transponder with a label defining the at least one short-range transponder;
searching at least one database responsive to the label to retrieve multiple labels associated respectively with multiple short-range transponders and retrieving a plurality of zones, a plurality of conditions and a plurality of actions corresponding to the multiple labels;
accessing, from the at least one database, a plurality of parameter sets defining the respective plurality of zones associated with the multiple labels; and
transmitting the parameters defining the plurality of zones, the plurality of conditions and the plurality of actions to the client device.

28. The method of claim 27, wherein the at least one condition of the plurality of conditions includes a condition that triggers at least one action of the plurality of actions responsive to a current estimated zone of the client device corresponding to at least one zone of the plurality of zones.

29. The method of claim 28, wherein the at least one condition includes a condition that triggers the at least one action responsive to a current estimated zone of the client device corresponding to the at least one zone and at least one previous estimated zone of the client device corresponding to at least one other zone.

30. The method of claim 27, further including:
receiving a client identifier from the client device; and
retrieving at least one of demographic data or prior purchasing data from the at least one database pertinent to the client identifier;
wherein the plurality of conditions includes a condition that triggers the at least one action responsive to the retrieved demographic or prior purchasing data.

31. A server apparatus configured to provide conditions and actions to a client device based on proximity of the client device to short-range transponders in a predetermined area, the apparatus comprising:
a transceiver configured to transmit and receive data to and from the client device;
at least one database containing zone definitions associated with labels corresponding to respective short-range transponders and conditions and actions associated with the labels;
a processor, coupled to the at least one database, and software that configures the processor to:
receive, from the transceiver, a signal characteristic and a label defining the at least one short-range transponder;

search the at least one database responsive to the received label to retrieve at least one of the zones associated with the label, the at least one of the zones defined in terms of the signal characteristic;

determine at least one of the conditions and at least one of the actions associated with the at least one zone;

access, from the at least one database, at least one set of parameters defining the at least one zone; and transmit, via the transceiver, the parameters defining the at least one zone, the at least one condition and the at least one action to the client device.

32. The server apparatus of claim 31, wherein the parameters include at least one of a zone map, a range of distances for the at least one zone or values of the signal characteristic defining a probability distribution to be used to estimate zone membership.

33. The server apparatus of claim 31, wherein the software further configures the processor to determine the at least one condition and the at least one action associated with the zone responsive to a region of interest corresponding to the at least one transponder.

34. The server apparatus of claim 31, further including:

a service gateway configured to provide access to at least one database external to the server apparatus;

wherein and the software further configures the processor to determine the at least one condition and the at least one action associated with the zone responsive to product promotions retrieved via the service gateway.

35. The server apparatus of claim 31, further including:

a service gateway configured to provide access to at least one database external to the server apparatus;

wherein and the software further configures the processor to determine the at least one condition and the at least one action associated with the zone responsive to demographic data retrieved via the service gateway.

36. The server apparatus of claim 31, further including a mesh network interface configured to communicate with the short-range transponders.

\* \* \* \* \*